United States Patent
Troje (10) Patent No.: US 12,464,105 B2
(45) Date of Patent: Nov. 4, 2025

(54) SYSTEM AND METHOD FOR DETERMINING DIRECTIONALITY OF IMAGERY USING HEAD TRACKING

(71) Applicant: Nikolaus Troje, Kingston (CA)

(72) Inventor: Nikolaus Troje, Kingston (CA)

(73) Assignee: Nikolaus Troje, Kingston (CA)

( * ) Notice: Subject to any disclaimer, the term of this patent is extended or adjusted under 35 U.S.C. 154(b) by 371 days.

(21) Appl. No.: 18/002,348

(22) PCT Filed: Jun. 22, 2021

(86) PCT No.: PCT/CA2021/050857
§ 371 (c)(1),
(2) Date: Dec. 19, 2022

(87) PCT Pub. No.: WO2021/258201
PCT Pub. Date: Dec. 30, 2021

(65) Prior Publication Data
US 2023/0231983 A1    Jul. 20, 2023

Related U.S. Application Data

(60) Provisional application No. 63/042,498, filed on Jun. 22, 2020.

(51) Int. Cl.
*H04N 13/279* (2018.01)
*G06F 3/01* (2006.01)
(Continued)

(52) U.S. Cl.
CPC ........... *H04N 13/279* (2018.05); *G06F 3/012* (2013.01); *G06F 3/013* (2013.01); *H04N 13/243* (2018.05);
(Continued)

(58) Field of Classification Search
CPC .. H04N 13/279; H04N 13/363; H04N 13/243; H04N 13/366; G06F 3/012; G06G 3/013
(Continued)

(56) References Cited

U.S. PATENT DOCUMENTS 9,367,951 B1 *   6/2016   Gray ..................... G06T 15/20
9,756,303 B1 *   9/2017   De La Cruz ......... H04N 9/3194
(Continued)

FOREIGN PATENT DOCUMENTS

EP    2189835 A1    5/2010

OTHER PUBLICATIONS

International Search Report for PCT application No. PCT/CA2021/050857, CIPO, search completed: Sep. 16, 2021, mailed: Oct. 20, 2021.
(Continued)

*Primary Examiner* — Jin Ge
(74) *Attorney, Agent, or Firm* — Bhole IP Law; Marc Lampert (57) ABSTRACT

There is provided a system and method for reinstating directionality of onscreen displays of three-dimensional (3D) imagery using sensor data capturing eye location of a user. The method can include: receiving the sensor data capturing the eye location of the user; tracking the location of the eyes of the user relative to a screen using the captured sensor data; determining an updated rendering of the onscreen imagery using off-axis projective geometry based on the tracked location of the eyes of the user to simulate an angled viewpoint of the onscreen imagery from the perspective of the location of the user; and outputting the updated rendering of the onscreen imagery on a display screen.

18 Claims, 11 Drawing Sheets

(51) Int. Cl.
 *H04N 13/243* (2018.01)
 *H04N 13/363* (2018.01)
 *H04N 13/366* (2018.01)
(52) U.S. Cl.
 CPC ......... *H04N 13/363* (2018.05); *H04N 13/366* (2018.05)
(58) Field of Classification Search
 USPC ........................................................ 345/419
 See application file for complete search history.

(56) References Cited

U.S. PATENT DOCUMENTS

| | | | |
|---|---|---|---|
| 10,499,044 | B1 | 12/2019 | Giokaris et al. |
| 2013/0321564 | A1 | 12/2013 | Smith et al. |
| 2014/0118357 | A1 | 5/2014 | Covington |
| 2014/0267413 | A1* | 9/2014 | Du .................. G06V 40/171 345/633 |
| 2015/0145887 | A1* | 5/2015 | Forutanpour ....... G06F 3/04815 345/633 |
| 2021/0104063 | A1* | 4/2021 | Kassis ................. G06F 3/0304 |
| 2023/0116638 | A1* | 4/2023 | Martínez ................ G06T 7/277 382/103 |

OTHER PUBLICATIONS

Written Opinion of the International Searching Authority for PCT application No. PCT/CA2021/050857, CIPO, search completed: Sep. 17, 2021, mailed: Oct. 20, 2021.
Ganin, Yaroslav, et al., "Deepwarp: Photorealistic image resynthesis for gaze manipulation", (2016). Paper presented at the European Conference on Computer Vision.
Juang, Jingwei, et al., "6-DOF VR videos with a single 360-camera", (2017). Paper presented at the 2017 IEEE Virtual Reality (VR).
Jones, Andrew, et al., "Achieving eye contact in a one-tomany 3D video teleconferencing system", (2009). Paper presented at the ACM Transactions on Graphics (TOG).
Khan, M. S. L., et al., "Telepresence Mechatronic Robot (tebot): Towards the design and control of Socially Interactive bio-inspired system", (2016). Journal of Intelligent & Fuzzy Systems, 31(5), 2597-2610.
King, Davis E., "Dlib-ml: A machine learning toolkit", (2009). Journal of Machine Learning Research, 10(Jul), 1755-1758.
Lepetit, Vincent, et al., "EPnP: An Accurate O(n) Solution to the PnP Problem", (2009). International Journal of Computer Vision, 81(2), 155.
O'Regan, J. Kevin, et al., "A sensorimotor account of vision and visual consciousness", (2001). Behavioral and Brain Sciences, 24(05), 939-973.
Orts-Escolano, Sergio, et al., "Holoportation: Virtual 3D Teleportation in Real-time", (2016). Paper presented at the Proceedings of the 29th Annual Symposium on User Interface Software and Technology.
Scheer, Jonas, et al., "A client-server architecture for real-time view-dependent streaming of free-viewpoint video", (2017). Paper presented at the 2017 3DTV Conference: The True Vision-Capture, Transmission and Display of 3D Video (3DTV-CON).
Slater, Mel, "Place illusion and plausibility can lead to realistic behaviour in immersive virtual environments", (2009). Philosophical Transactions of the Royal Society B: Biological Sciences, 364(1535), 3549-3557.
Troje, N. F., "Reality Check", (2019). Perception, 48(11), 1033-1038. Sage Publications Sage UK: London, England, https://doi.org/10.1177/0301006619879062.
Ueberheide, Matthias, et al., "Web-based interactive free-viewpoint streaming: A framework for high quality interactive free viewpoint navigation", (2015). Paper presented at the Proceedings of the 23rd ACM international conference on Multimedia.
Wallach, et al., "The kinetic depth effect", (1953). Journal of Comparative Psychology, 45, 205-217.
Wang, Xiaoye Michael, et al., "Perceptual Distortions Between Windows and Screens: Stereopsis Predicts Motion Parallax", 2020 IEEE Conference on Virtual Reality and 3D User Interfaces Abstracts and Workshops (VRW), Atlanta, GA, USA, 2020, pp. 684-685, doi: 10.1109/VRW50115.2020.00193.
Zitnick, C. L., et al., "High-quality video view interpolation using a layered representation", (2004). ACM Transactions on Graphics (TOG), 23(3), 600-608.
Extended European Search Report for EU application No. EP21828709.2, EPO, dated: May 29, 2024.

* cited by examiner

SYSTEM AND METHOD FOR DETERMINING DIRECTIONALITY OF IMAGERY USING HEAD TRACKING

TECHNICAL FIELD

The following relates generally to computer vision and telecommunications; and more particularly, to systems and methods for determining directionality of imagery using head tracking.

BACKGROUND

Applications such as internet shopping and tele-communications are generally mediated by two-dimensional (2D) screen displays, even though typical human interactions occur in three-dimensions (3D). Solutions for providing 3D interactions generally require users to wear head gear, which is generally undesirable for most applications.

SUMMARY

In an aspect, there is provided a computer-implemented method for reinstating directionality of onscreen displays of three-dimensional (3D) imagery using sensor data capturing eye location of a user, the method comprising: receiving the sensor data capturing the eye location of the user; tracking the location of the eyes of the user relative to a screen using the captured sensor data; determining an updated rendering of the onscreen imagery using off-axis projective geometry based on the tracked location of the eyes of the user to simulate an angled viewpoint of the onscreen imagery from the perspective of the location of the user; and outputting the updated rendering of the onscreen imagery on a display screen.

In a particular case of the method, a screen displaying the onscreen imagery and a sensor capturing the sensor data are approximately collocated, and wherein tracking the location of the eyes comprises determining an interocular distance between the eyes of the user and triangulating a distance to the sensor using a predetermined interocular distance.

In another case of the method, the sensor data comprises a series of images captured by a camera directed at the eyes of the user.

In yet another case of the method, the location of the eyes of the user is determined using a perspective-n-point algorithm.

In yet another case of the method, the location of the eyes of the user is determined using Light Detection and Ranging (Lidar) or RGB-D cameras.

In yet another case of the method, determining the updated rendering of the onscreen imagery comprises determining the off-axis projection by projecting the captured image onto a planar canvas that is in a same location relative to a camera-projector as the user is relative to the camera position, and copying the content of the planar canvas onto a screen buffer of a screen of the onscreen imagery.

In yet another case of the method, the onscreen imagery comprises a three-dimensional object, and wherein rendering a viewing angle of the three-dimensional object is based on the location of the eyes of the user relative to a screen.

In yet another case of the method, the sensor data further comprises facial features to extract a facial expression, and wherein the three-dimensional object comprises a three-dimensional avatar of the user mimicking the user's facial expressions.

In yet another case of the method, the onscreen imagery comprises a recorded video of a secondary user, the video recorded by an array of cameras to film multiple viewpoints of the secondary user, and wherein the angled viewpoint of the onscreen imagery for the user matches at least one of the multiple viewpoints.

In yet another case of the method, the array of cameras comprises four cameras.

In another aspect, there is provided a system for reinstating directionality of onscreen displays of three-dimensional (3D) imagery using sensor data capturing eye location of a user, the system comprising one or more processors in communication with a memory storage, the one or more processors configured to execute: an input module to receive the sensor data capturing the eye location of the user; a tracking module to track the location of the eyes of the user relative to the sensor using the captured sensor data; a rendering module to determine an updated rendering of the onscreen imagery using off-axis projective geometry based on the tracked location of the eyes of the user to simulate an angled viewpoint of the onscreen imagery from the perspective of the tracked location of the user; and an output module to output the updated rendering of the onscreen imagery on a display screen.

In a particular case of the system, the screen displaying the onscreen imagery and the sensor capturing the sensor data are approximately collocated, and wherein tracking the location of the eyes comprises determining an interocular distance between the eyes of the user and triangulating a distance to the sensor using a predetermined interocular distance.

In another case of the system, the sensor comprises a camera and the sensor data comprises a series of images captured by the camera directed at the eyes of the user.

In yet another case of the system, the location of the eyes of the user is determined using a perspective-n-point algorithm.

In yet another case of the system, the location of the eyes of the user is determined using Light Detection and Ranging (Lidar) or RGB-D cameras.

In yet another case of the system, determining the updated rendering of the onscreen imagery comprises determining the off-axis projection by projecting the captured image onto a planar canvas that is in a same location relative to a camera-projector as the user is relative to the camera position, and copying the content of the planar canvas onto a screen buffer of a screen of the onscreen imagery.

In yet another case of the system, the onscreen imagery comprises a three-dimensional object, and wherein rendering a viewing angle of the three-dimensional object is based on the location of the eyes of the user relative to a screen.

In yet another case of the system, the sensor data further comprises facial features to extract a facial expression, and wherein the three-dimensional object comprises a three-dimensional avatar of the user mimicking the user's facial expressions.

In yet another case of the system, the onscreen imagery comprises a recorded video of a secondary user, the video recorded by an array of cameras to film multiple viewpoints of the secondary user, and wherein the angled viewpoint of the onscreen imagery for the user matches at least one of the multiple viewpoints.

In yet another case of the system, the array of cameras comprises four cameras.

These and other aspects are contemplated and described herein. It will be appreciated that the foregoing summary sets out representative aspects of the system and method to assist skilled readers in understanding the following detailed description.

BRIEF DESCRIPTION OF THE DRAWINGS

A greater understanding of the embodiments will be had with reference to the figures, in which.

DETAILED DESCRIPTION

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine, or device exemplified herein that executes instructions may include or otherwise have access to computer-readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer-readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application, or module herein described may be implemented using computer readable/executable instructions that may be stored or otherwise held by such computer-readable media and executed by the one or more processors.

Generating, rendering, and displaying an object in three-dimensional (3D) depth on a two-dimensional (2D) screen may be achieved by means that are able to deliver two different images of a displayed object to each of the two eyes of an observer. This stereoscopic vision is generally used to provide depth perception. Depth, however, can be conveyed by multiple different cues. While, stereopsis can convey a strong subjective sense of depth, it is not a particularly important depth cue. Stereo-blind people report only minor problems with depth perception, and some do not even know that they are stereo-blind.

A prominent monocular depth cue, particularly in real-world vision, is motion parallax; which refers to the fact that a series of changing images projected on a single retina, as a person actively move through an environment, can be employed for depth perception. Motion parallax, in contrast to stereopsis, provides additional benefits because it provides people with a well-defined and well-behaving location in visual space. It situates people in the visual environment and enables them to control that location. In this way, it provides directionality.

However, motion parallax is not typically used for 2D screens. For instance, if an actor shown on a screen seems to look (or point their finger) at a person, the actor will do so even if the person changes their location in front of the screen. The actor is perceived to be looking at the person, no matter where that person is situated. This disrupts contingent gaze behaviour between two people, affects joint-attention, and makes it impossible to use gaze in multi-person video conferencing situations to address a specific person within a group. The lack of contingency translates into a lack of directionality, which in turn is a key reason why interlocutors engaging in a normal video conference do not tend to experience co-presence. It is probably a reason why extensive video conferencing is more tiring and less efficient than real face to face communication.

Directionality is used herein in the sense that directions in a three-dimensional space or environment are shared between interlocutors in real-life face-to-face encounters. As a consequence, if one person looks (or points) at the other person, that other person perceives being looked (or pointed) at. Gaze and other deictic behaviours become dynamic. A person can decide to avoid someone's gaze by moving out of that person's line of sight, or to catch someone's gaze by moving into that person's line of sight. Note, that directionality is lacking in conventional video conferencing systems.

Advantageously, the present embodiments can reinstate directionality in screen-based video conferencing by tracking the location of the user relative to their screen and then rendering a view of the 3D imagery to that screen to produce the same or similar type of visual stimulation that a user would receive if they were, for example, looking at the 3D imagery through a window opening framed by the edges of the screen.

The present embodiments can be used to visualize static and moving objects. In a particularly advantageous implementation, the present embodiments can be used in the realm of video communication between two or more interlocutors. Reintroducing directionality into video conferencing reinstates the rich repertoire of non-verbal, deictic behaviour that constitutes a central communication channel complementing verbal communication.

Virtual reality (VR) reintroduces motion parallax, and therefore directionality and co-presence. However, VR comes with serious limitations. For example, the user has to wear awkward headsets that shield them from their real environment, limit their mobility therein, and cover face and facial expressions. Further, while it is straightforward to interact with computer-generated graphical contents (including avatars) there is no easy way to render a photorealistic copy of another person in virtual reality.

Efforts have been made to introduce additional sensorimotor contingencies into video telecommunication to alleviate the effects of the lack of directionality on communication. These include autosteroscopic horizontal-parallax 3D displays, electromechanical robot necks/heads to mirror human head movement, and gaze correction software. In some cases, real-time 3D replication of people and objects in VR have been attempted. Generally, none of these approaches has resulted in feasible applications and populace uptake. Generally, these approaches either require the users to wear bulky head gear or they do not exploit the full potential of realistic motion parallax and the fact that it can be decoupled from stereoscopic depth.

To overcome at least some of the technical challenges in the art, embodiments of the present disclosure can track a user's head location in 3D space and apply it to a rendering pipeline in order to simulate self-induced motion parallax. The present inventor has determined, through example experiments, that motion parallax alone, even without combining it with stereoscopic depth, is sufficient to re-instantiate directionality. While the present disclosure may refer to applications for tele-communication, it is understood that the present embodiments can be used for any suitable application; such as any situation where display of an object in 3D on a screen, and means to determine a user's location relative to the screen, is available.

Figure 1:
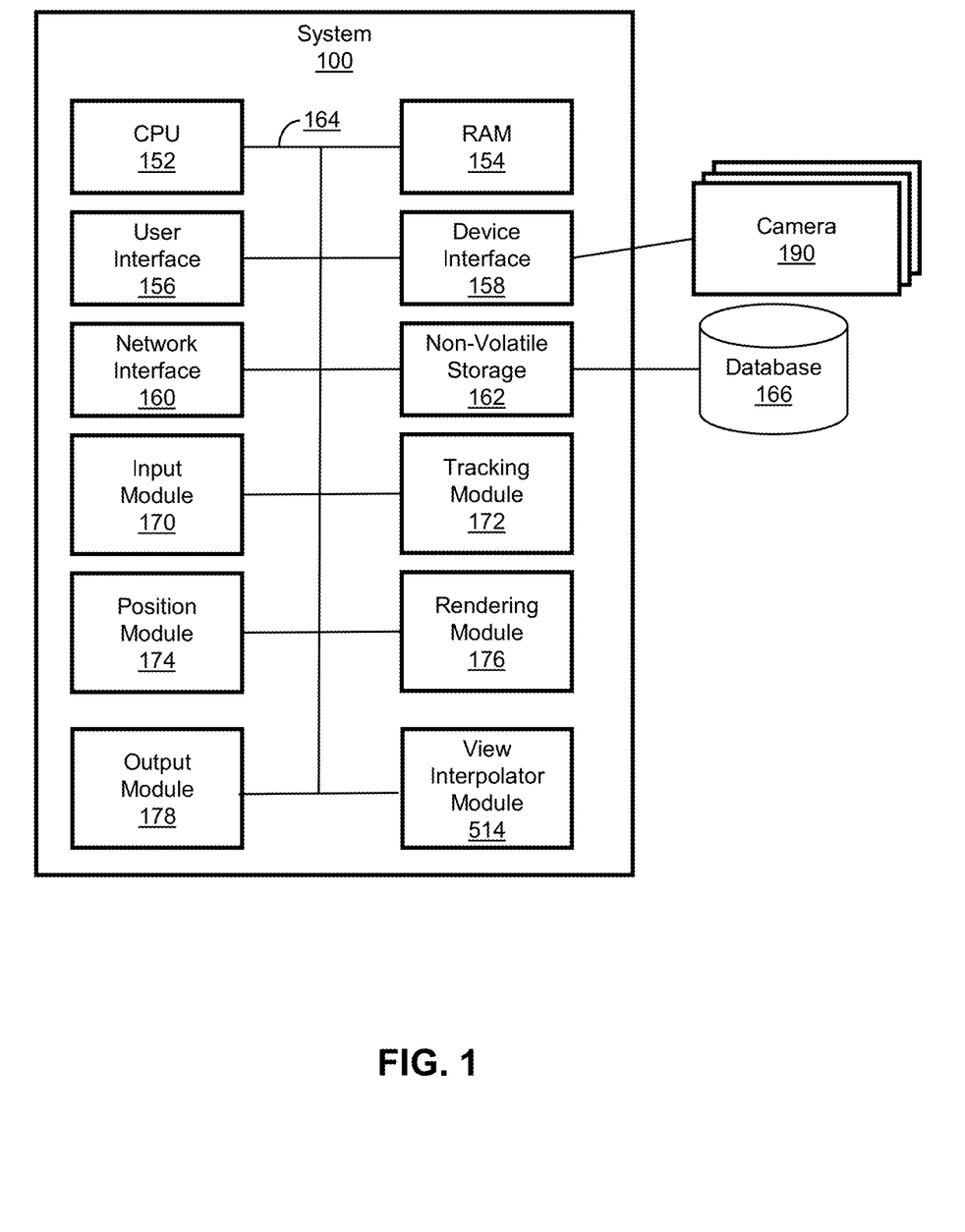
FIG. 1 illustrates a block diagram of a system for determining directionality of imagery using head tracking, according to an embodiment.

Turning to FIG. 1, a system 100 for reinstating directionality of onscreen displays of three-dimensional (3D) imagery using sensor data capturing eye location of a user is shown, according to an embodiment. In this embodiment, the system 100 is run on a local computing device (for example, a personal computer). In further embodiments, the system 100 can be run on any other computing device; for example, a server, a dedicated piece of hardware, a tablet computer, a smartphone, a microprocessor, or the like. In some embodiments, the components of the system are stored by and executed on a single computing device. In other embodiments, the components of the system 100 are distributed among two or more computer systems that may be locally or remotely distributed; for example, using cloud-computing resources.

FIG. 1 shows various physical and logical components of an embodiment of the system 100. As shown, the system 100 has a number of physical and logical components, including a central processing unit ("CPU") 152 (comprising one or more processors), random access memory ("RAM") 154, a user interface 156, a device interface 158, a network interface 160, non-volatile storage 162, and a local bus 164 enabling CPU 152 to communicate with the other components. CPU 152 executes various modules, as described below in greater detail. RAM 154 provides relatively responsive volatile storage to CPU 152. The user interface 156 enables an administrator or user to provide input via an input device, for example a mouse or a touchscreen. The user interface 156 can also output information to output devices, such as a screen or speakers. In some cases, the user interface 156 can have the input device and the output device be the same device (for example, via a touchscreen). The device interface 158 can communicate with one or more sensors 190 to capture a position of the user's head, eyes, or other facial features. In the present disclosure, the sensor is referred to as a camera capturing images of the user for detection of the head and eyes; however, any suitable sensor for determining user head and/or eye position can be used. In some cases, the communication with the one or more sensors can be via a network relay board, for example in communication with the network interface 160. In further embodiments, the device interface 158 can retrieve already captured images from the local database 166 or a remote database via the network interface 160. The network interface permits communication with other systems, such as other computing devices and servers remotely located from the system 100, such as for cloud-computing operations. The network communication can be over, for example, an ethernet connection, a local-area-network (LAN), a wide-area-network (WAN), a mobile network, the Internet, or the like. Non-volatile storage 162 stores data, including computer-executable instructions for implementing the modules, as well as any data used by these services. Additional stored data can be stored in a database 166. During operation of the system 100, the modules and the related data may be retrieved from the non-volatile storage 162 and placed in RAM 154 to facilitate execution.

In some cases, the one or more sensors 190 can be video cameras capturing a sequence of images. In an example, the one or more sensors 190 can be webcams or front-facing cameras.

In an embodiment, the system 100 further includes a number of conceptual modules can be executed on the one or more processors of the CPU 152, including an input module 170, a detection module 172, a position module 174, a rendering module 176, and an output module 178. In some cases, the system can also include a view interpolator module 514. In some cases, the functions of the modules may be performed on other modules, combined with other modules, or performed on remote systems.

Generally, in order to create the experience of normal motion parallax, the system 100 produces on screen the same or similar stimulation to what a user's single eye would experience if the edges of the screen were framing a window through which objects or people are seen. Since, in embodiments of the present disclosure, the view changes can be contingent on the position of the user relative to the screen, that location is detected and the imagery on one or more objects on the screen can be updated accordingly.

Figure 2:
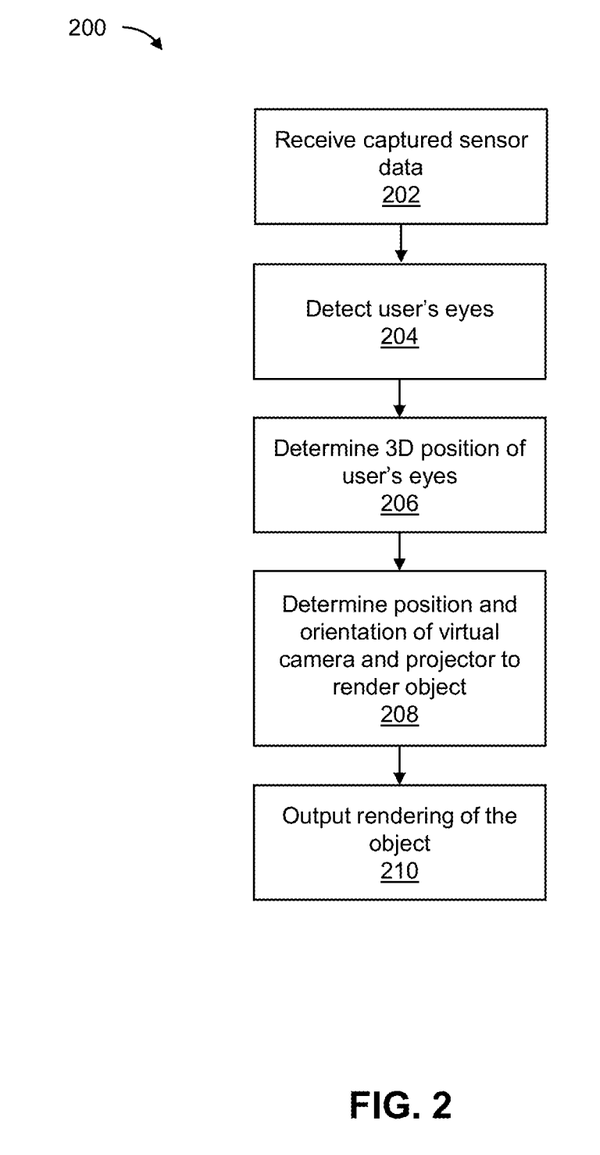
FIG. 2 illustrates a flow diagram of a method for determining directionality of imagery using head tracking, according to an embodiment.

FIG. 2 illustrates a method 200 for reinstating directionality of onscreen displays of three-dimensional (3D) imagery using sensor data capturing eye location of a user, in accordance with an embodiment.

At block 202, the input module 170 receives captured sensor data from the one or more sensors 190. The captured sensor data covers at least a portion of the face of a user including the user's eyes.

At block 204, the detection module 172 detects the eye's of the user from the captured sensor data. Any suitable feature detection modality can be used.

At block 206, the position module 174 determines a three-dimensional position of the user's eyes relative to the camera. The position module 174 tracks a real-time 3D location of the user's eyes with respect to the screen. In some cases, for orientation of the user's face, the position module 174 can track other facial features of the user in addition to the eyes; for example, the user's mouth. In an example, dlib multiple object tracking can be used to track the user's eyes and facial features.

In tele-communication, lags between the movement of a user's head and updates of a visual display on the screen need to be kept minimal for believability. In some cases, the position module 174 predictively tracks the user's eyes to lessen any perceived lag; especially for applications where real time internet connections are involved. In some cases, the position module 174 uses optical motion capture or other depth-sensing technology such as Lidar or RGB-D cameras. In some cases, latency compensation can be used to reduce apparent lag for the user. In some cases, where there are fast and stable connections (e.g., with mature 5G technology), these latency corrections may not be needed as any transmission latencies may be below the threshold of perceptibility.

In most cases, the camera is collocated, or located near, the screen so distance to the camera will approximate distance between the user and the screen. Since interocular distance is relatively constant across different people with different head shapes and sizes, the system 100 can use interocular distance to estimate the distance between the user and the screen. In most cases, the distance is determined in combination with a robust orientation estimate. In an example, openCV Perspective-n-Point can be used to estimate the 3D location to the user's eyes. The distance, in combination with the position of the user's eyes determined by the detection module 172, can be used to determine a 3D position of the user's eyes. In this way, the system can use the position information and distance information to render objects on the screen with motion parallax mediated depth.

At block 208, the rendering module 176 uses the head position to update a position and orientation of a virtual camera-projector pair. The virtual camera captures the scene as it would appear from that viewpoint. Off-axis projection is than implemented to project the captured view onto the planar canvas that is in the same location relative to the camera-projector as the user is relative to the real screen. The content of that canvas is then copied into the screen buffer of the real screen. The result is that the real screen now behaves like a window into the virtual world, while still lacking stereoscopic depth information. The rendering module 176 determines off-axis projections of an object displayed on the screen. The rendering module 176 combines a virtual fronto-parallel camera with a virtual projector that can handle slanted surfaces. In this way, the rendering module 176 can be used to display objects or to convincingly create the illusion of depth and directionality between interlocutors in a telecommunication each represented by avatars. In an example, for photorealistic video-conferencing, the one or more sensors 190 (in this case being cameras) are not only used to determine the location of the user, but also to record footage of their face. In some cases, one camera may not be enough. In an embodiment, there are four cameras with one in each corner of the screen. The four video streams from the cameras are interpolated by the rendering module 176 to provide a single view from the viewpoint that is provided by the tracking system that follows the other interlocutor's head. Any suitable viewpoint interpolation algorithms can be used (for example, Huang, J., Chen, Z., Ceylan, D., & Jin, H. (2017). 6-DOF VR videos with a single 360-camera. Paper presented at the 2017 IEEE Virtual Reality (VR)).

At block 210, the output module 178 outputs the rendering of the object to the user interface 156 to be displayed on the screen. In further cases, the output module 178 can output the 3D position of the user's eyes and/or the directionality information to the network interface 160, to the database 166, or to the RAM 154.

Advantageously, the present embodiments dissociate between stereopsis and motion parallax, and instead implement the present inventor's experimentally confirmed insight that motion parallax alone conveys exactly those aspects of three-dimensionality that disrupt directionality between two communicating people. Thus, the present embodiments are able to implement depth through motion parallax.

Advantageously, the system 100 does not need to display imagery stereoscopically to the two eyes of the user; meaning that no head gear or other similar setup is strictly required. The imagery rendered by the rendering module 176 can generally run on any two-dimensional screen, including smartphone screens.

In an example application, the present embodiments can be used in the display of 3D computer generated objects on a 2D screen to a user such that the user experiences full motion parallax. That means that the user can look at objects from different viewpoints as if they were presented behind a window framed by the computer screen. In an example, this application can be used by internet stores to present their products with a 3D perspective. In this example, the user can inspect the object from different viewpoints by simply changing their location in front of the screen.

Figure 3:
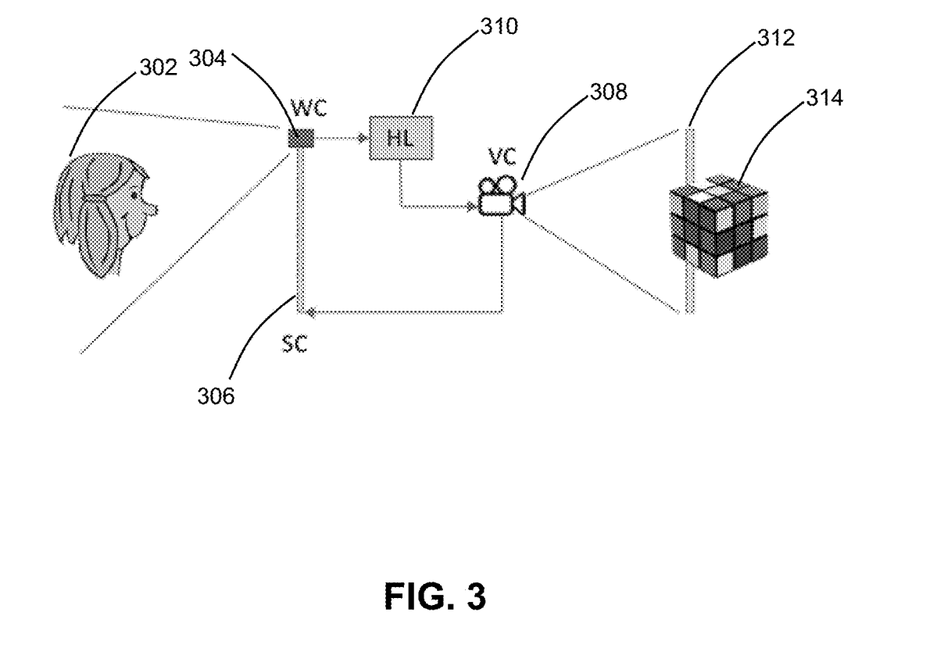
FIG. 3 illustrates a diagram for determining a head location of a user to steer a location of a virtual camera that renders an object.

As illustrated in the example diagram of FIG. 3, the system 100 can determine a head location 310 of the user 302 (in most cases, the user's eye location) relative to the camera 304. This location can be used to steer a location of a virtual camera 308 that renders an object 314; such that the same view on the screen 306 is generated to that what an observer would see if the object were a real 3D object located at a location right behind the virtual screen 312.

In an example, in a unidirectional case, data is received from sensors captured of person A and streamed to the screen of person B, where person A is rendered on person B's screen. Person A can be represented as a rigid avatar. The 3D avatar representing person A is described by a 3D geometry, which is centred in a local coordinate system, where a y-axis points vertically up and the nose of the avatar points towards a negative z-axis. The space in which person A moves has its origin in the centre of the screen, with a y-axis pointing up the screen and a z-axis pointing out of the screen; this coordinate system can be referred to as $S_A$. Person B is located in a different coordinate system ($S_B$), similar to the one of person A, but with person B's screen defining origin and orientation. The orientation of person A relative to $S_A$ can be expressed in terms of a homogenous 4×4 matrix that expresses rotation and location:

$$T_A = \begin{bmatrix} & & & x_A \\ & R_A & & y_A \\ & & & z_A \\ 0 & 0 & 0 & 1 \end{bmatrix}$$

For the above, $R_A$ is a rotation matrix and $[x_A, y_A, z_A]$ is the location relative to the origin of $S_A$. Updating the avatar based on person A's movements requires updating $T_A$ and then applying it to $C_A$ (also in homogenous coordinates):

$$\hat{C}_A = T_A C_A$$

This 3D geometry now needs to be rendered on person B's screen. That generally involves two steps, namely:
 a. another 3D transformation to account for person B's changing viewpoint, and
 b. the off-axis projection onto person B's 2D screen.

The 3D transformation depends on relative locations between person A and person B, not on their orientations. For example:
 If person B moves closer to the screen this can also be modelled as a movement of person A getting closer to her screen (z-axis). The sign of these two movements in the two coordinate systems is the same.
 If person B moves up, this is equivalent to person A moving down (y-axis). Here, the sign reverses.
 If person B moves left in his coordinate system, this is equivalent to person A moving left in her coordinate system (x-axis). The sign stays the same So, the movements of person B described in $S_A$ are captured by a matrix that only contains location, where I is the identity matrix:

$$L_B = \begin{bmatrix} & & & x_B \\ & I & & -y_B \\ & & & z_B \\ 0 & 0 & 0 & 1 \end{bmatrix}$$

As such, an updated 3D geometry of person A's avatar as seen on the screen of person B, from person B's viewpoint, can be described as:

$$\hat{C}_{AB} = L_B T_A C_A$$

An off-axis projection P, in this example, can be a 3×4 homogenous matrix that depends on the location of person B relative to person A $[x_A+x_B, y_A-y_B, z_A+z_B]$ and on the location of person B relative to his screen $[x_B, y_B, z_B]$:

$$P_{A,B} = \begin{bmatrix} . & . & . & . \\ . & . & . & . \\ 0 & 0 & 0 & 1 \end{bmatrix} L_B T_A C_A$$

In some cases, location coordinates $[x_A, y_A, z_A]$ and $[x_B, y_B, z_B]$ generated by the sensors needs to be converted into screen coordinate systems $S_A$ and $S_B$. In order to derive $T_A$, the location and orientation given by the sensors, another transformation matrix may be required. That transformation can either be derived if enough information is available about the sensor location relative to the centre of the screen, its focal length, and potential treatment of the data by, for example, ARkit. However, it could also be derived by means of a calibration. For calibration, person A centres himself in front of the screen with his nose and eyes pointing towards a vertical line in the centre of the screen and the distance between his eyes and the screen being measured as d (for example, with a ruler). In this position, a measure $T_A$ is taken by the sensor that contains the pose of the observer in sensor coordinates. A matrix D can then be determined such that:

$$D_A T'_A = \begin{bmatrix} 1 & 0 & 0 & 0 \\ 0 & 1 & 0 & 0 \\ 0 & 0 & 1 & d \\ 0 & 0 & 0 & 1 \end{bmatrix}$$

Solving the above can be performed because, for a rotation matrix, the inverse is equal to the transpose:

$$D_A = \begin{bmatrix} 1 & 0 & 0 & 0 \\ 0 & 1 & 0 & 0 \\ 0 & 0 & 1 & d \\ 0 & 0 & 0 & 1 \end{bmatrix} (T'_A)^{-1}$$

Once D is determined, $T_A$ can be replaced with $D T'_A$

The same approach can be used to calibrate the location of person B from sensor coordinates to $S_B$, and apply that calibration to person B's location in sensor coordinates:

$$P_{A,B} = \begin{bmatrix} . & . & . & . \\ . & . & . & . \\ 0 & 0 & 0 & 1 \end{bmatrix} D_B L'_B D_A T'_A C_A$$

In this example, rendering taking place on person B's system and uses $D_A$ as a constant that has to be transmitted from person A to person B only once. $T_A$ is time dependent and needs to be streamed from person A to person B.

Figure 4:
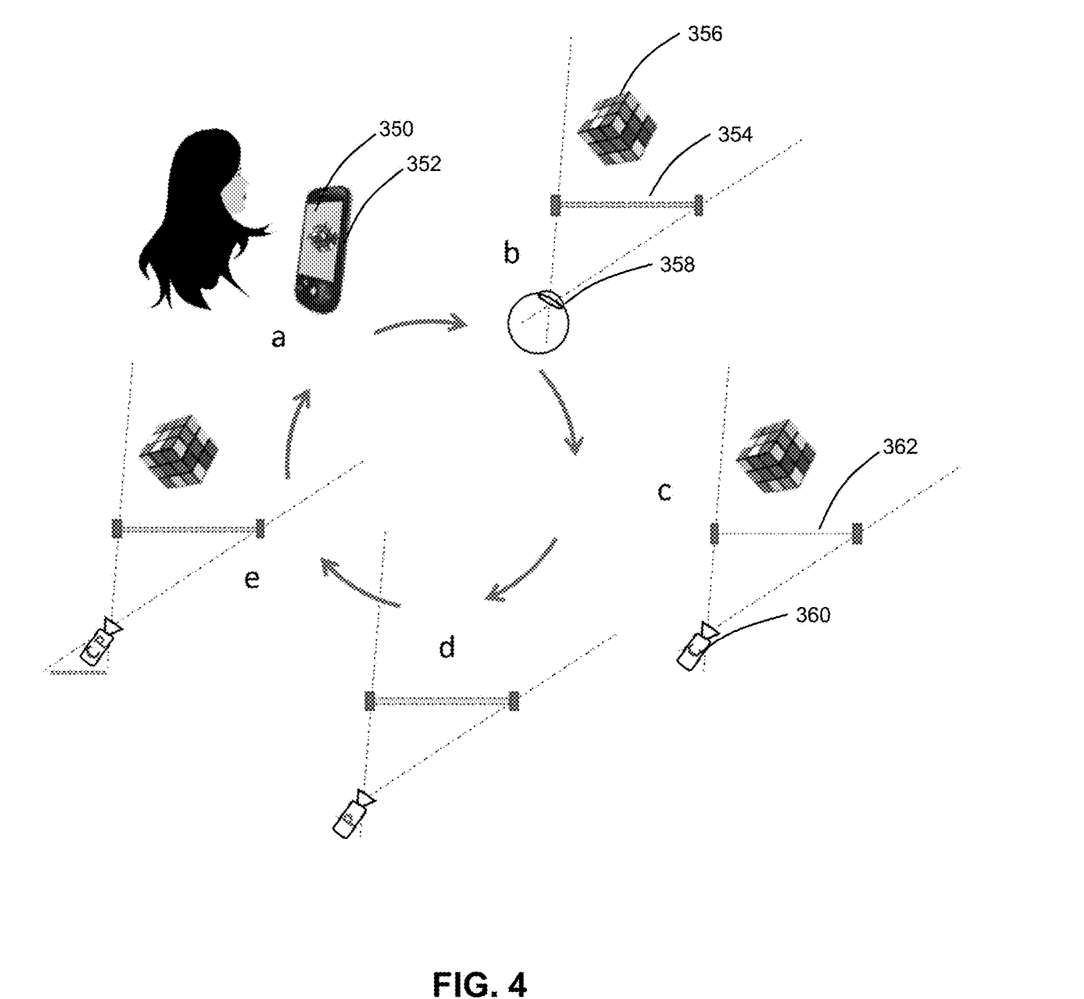
FIG. 4 illustrates a diagram for a timeline for determining the head location of the user to steer the location of the virtual camera that renders the object, as depicted in FIG. 3.

FIG. 4 illustrates a diagrammatic timeline of displaying a virtual object with head tracking directionality. The image on the screen 350 of the computing device 352 simulates a view through a virtual window 354 of a virtual object 356 within the margins of the screen based on the location of the user's eyes 358. The system 100 effectively captures a 'virtual picture' of the object 356 from the current location of the user's eyes 358 with a virtual camera 360. The virtual picture is projected back on a virtual screen 362. The contents of the virtual screen 362 are copied in the screen buffer of the real screen 350. Thus, the virtual camera and the virtual projector together implement a non-frontoparallel camera. As the user moves, the virtual camera and the virtual projector repeat these functions such that a video stream is generated on the real screen 350 that simulates what the user would be seeing if the screen 350 acted as a window to the virtual object 356.

In another example application, the present embodiments can be used in avatar-mediated telecommunication system that provides co-presence between two interlocutors by recovering directionality. In some cases, the detection module 172 can use the dlib facial landmark detector to track the location of a user's eyes. In some cases, the facial landmark detector can also be used to track other facial features in order to extract facial expressions and detailed head poses of the user; which can then be transferred onto an avatar. If both interlocutors of a video conversation use such avatars, each user can talk to the other avatar in a way that reinstates directionality.

Figure 5:
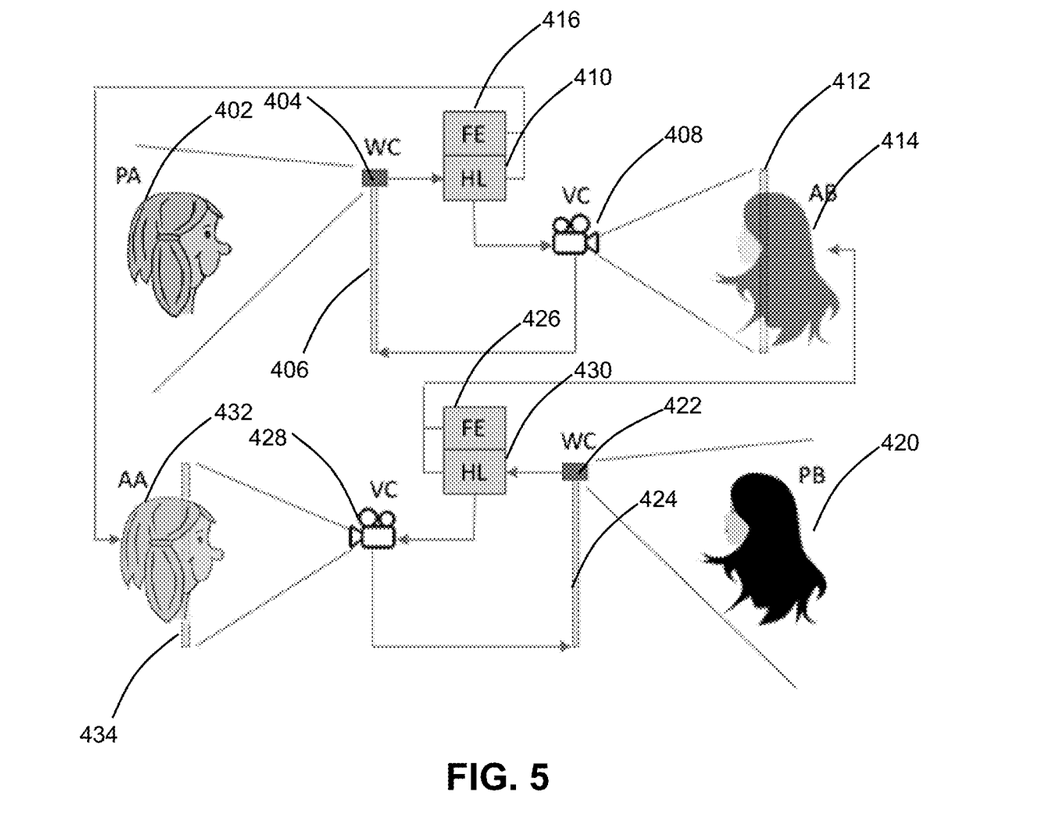
FIG. 5 illustrates a diagram for determining head locations of users in a virtual teleconference to steer a location of a virtual camera that renders avatars of the users.

As illustrated in the example diagram of FIG. 5, the system 100 can determine a head location 410 of a first user 402 (in most cases, the user's eye location) relative to the camera 404. In many cases, the camera 404 is fixed with respect to the screen 406 and, in this way, knowing the location of the eyes relative to the camera 404 means knowing the position of the eyes relative to the screen 406. This location can be used to steer a location of a virtual camera 408 that renders a visualization 414 of a second user 420; such that the same view on the screen 406 is generated to that what an observer would see if the second user 420 were located at a location right behind the virtual screen 412. In some cases, a facial expression 416 can also be determined from the captured image. At the same time, the system 100 can determine a head location 430 of the second user 420 (in most cases, the user's eye location) relative to the camera 422. This location can be used to steer a location of a virtual camera 428 that renders a visualization 432 of the first user 402; such that the same view on the screen 424 is generated to that what an observer would see if the first user 402 were located at a location right behind the virtual screen 434.

Figure 6:
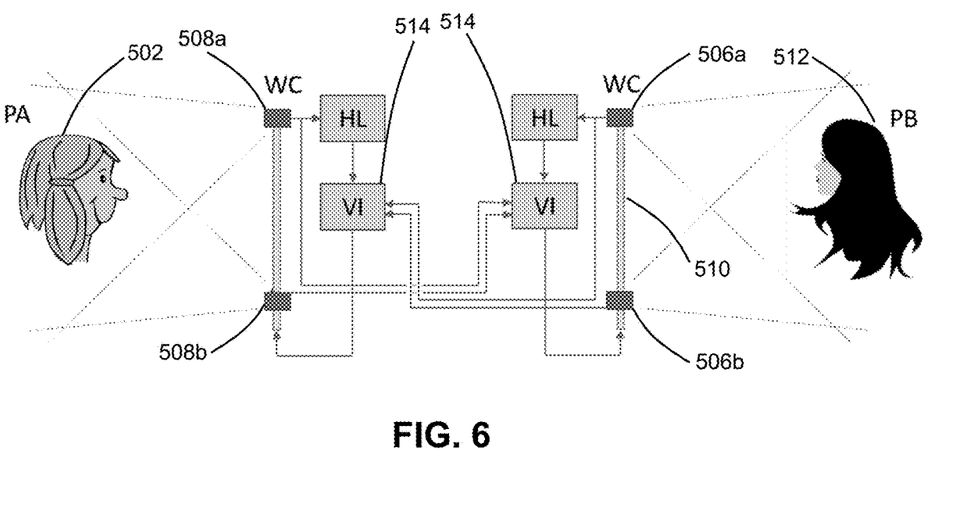
FIG. 6 illustrates a diagram for using an array of cameras in front of respective users in a teleconference.

In another example application, the present embodiments can be used in video-based telecommunications with directionality. As illustrated in the example diagram of FIG. 6, in some cases, there can be an array of cameras 508a, 508b in front of the first person 502 and an array of cameras 506a, 506b in front of the second person 512. Such movements mimic, in real time, the movements of the first person 502 to be displayed to the second person 512, and vice versa. Advantageously, in some cases, the system 100 to determine viewpoint interpolation can be fully contained in a computing device at each receiver.

In another example, the present embodiments can be used to generate new viewpoints based on input from just a single camera using viewpoint synthesis approaches (for example, Wang, T. C., Mallya, A., & Liu, M. Y. (2020). One-Shot Free-View Neural Talking-Head Synthesis for Video Conferencing. arXiv preprint arXiv: 2011.15126.)

Figure 7:
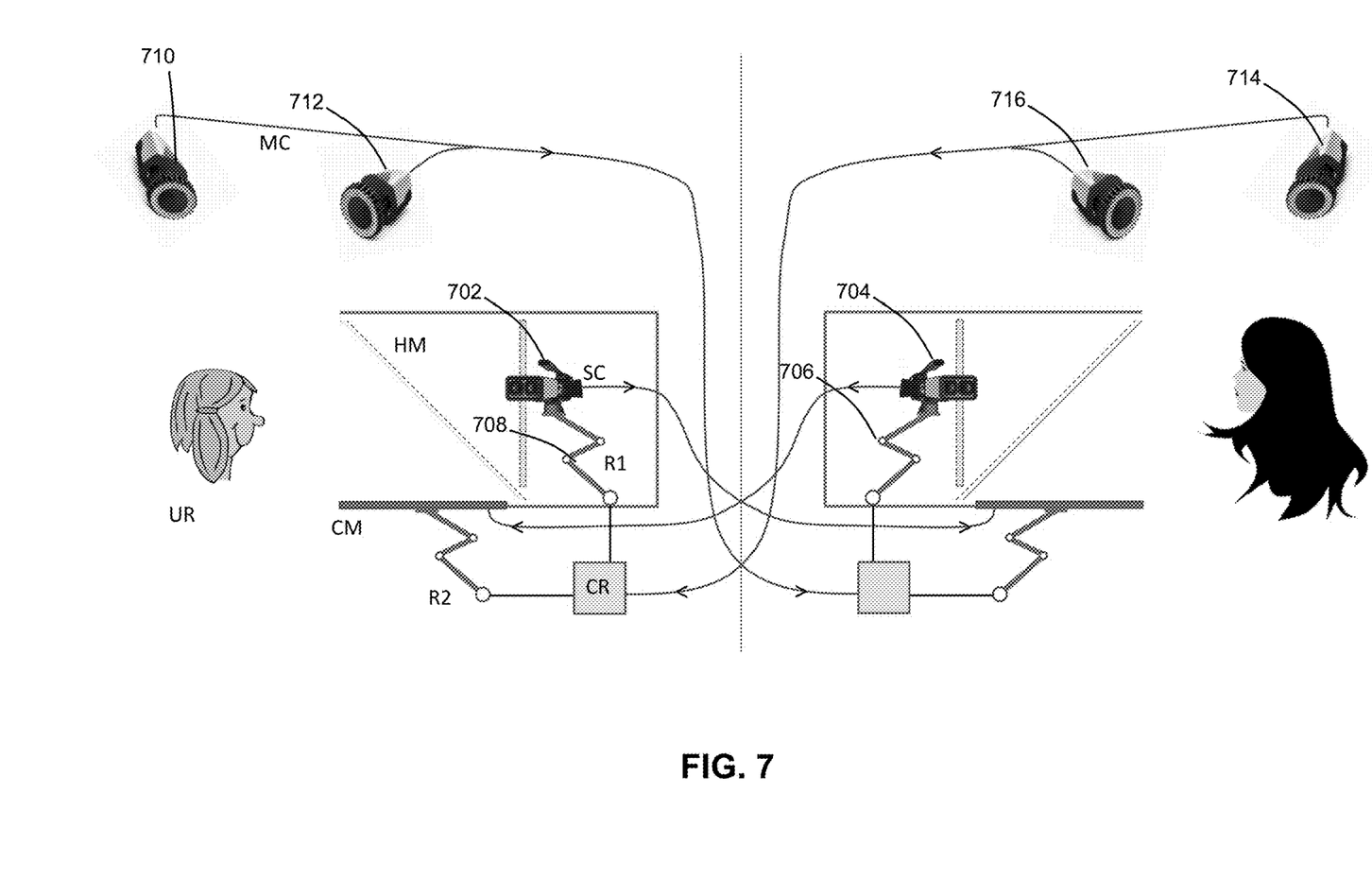
FIG. 7 illustrates a diagram of an example of video-based telecommunications.
Figure 8:
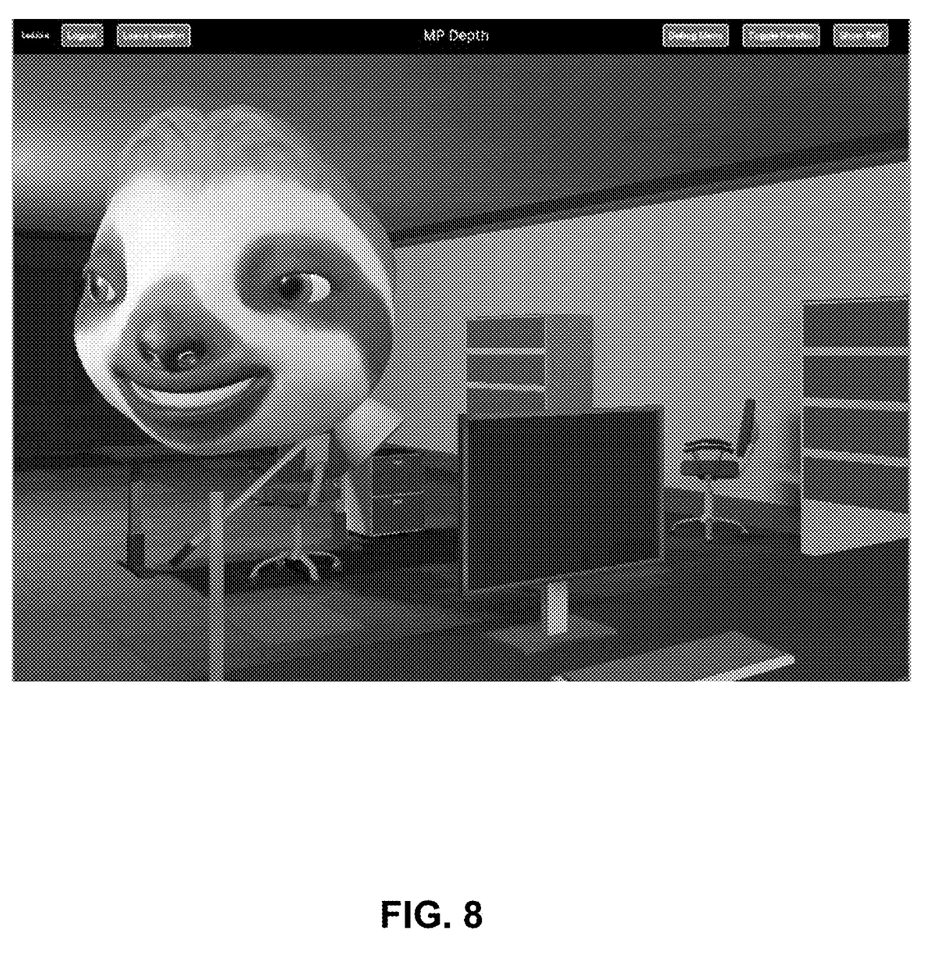
FIGS. 8 to 11 illustrate example output visualizations from an example experiment using the system of FIG. 3.
Figure 9:
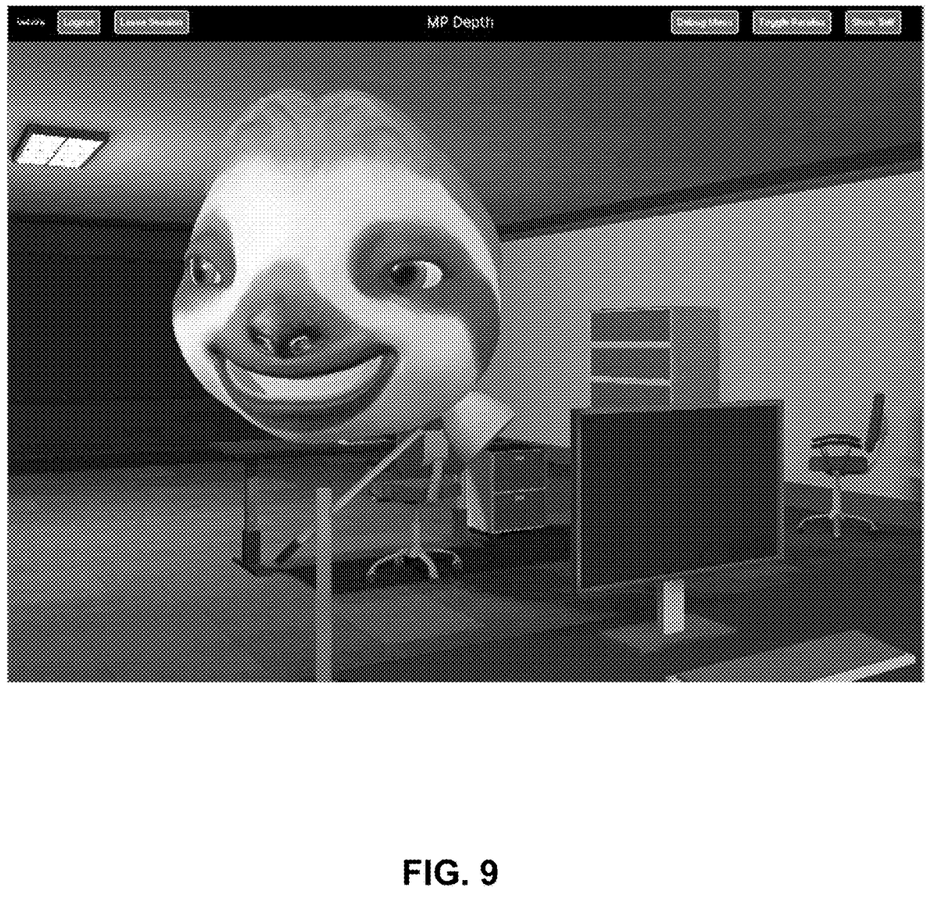
Figure 10:
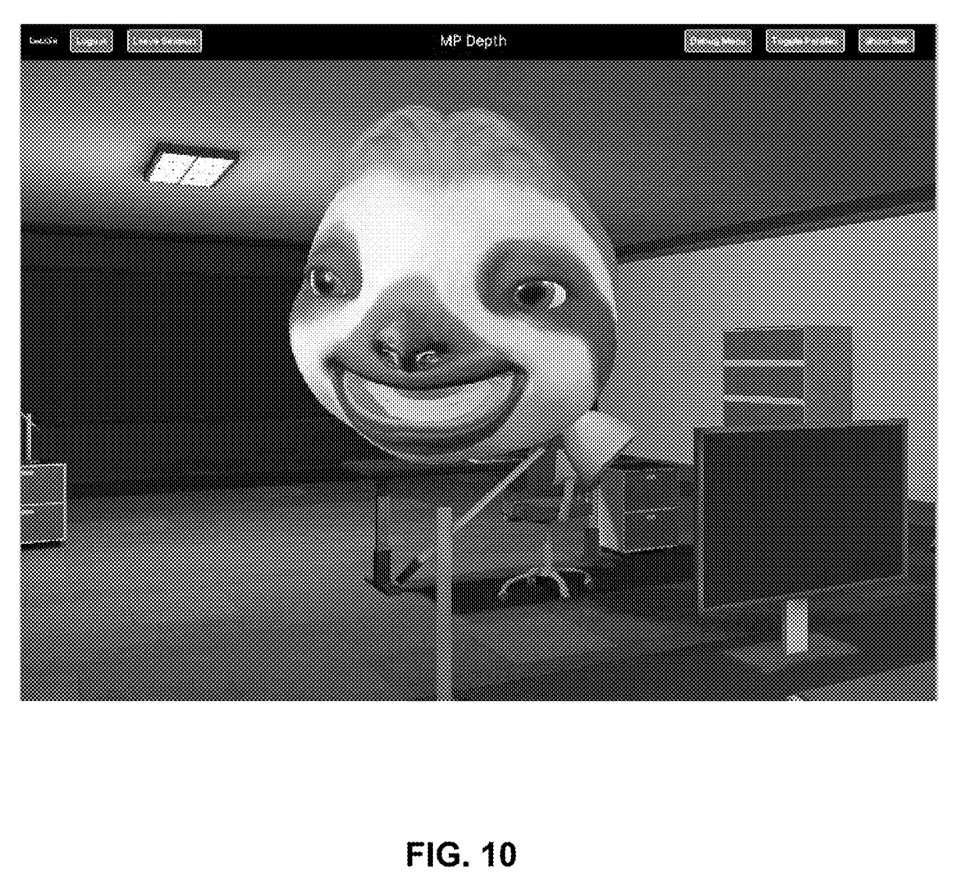
Figure 11:
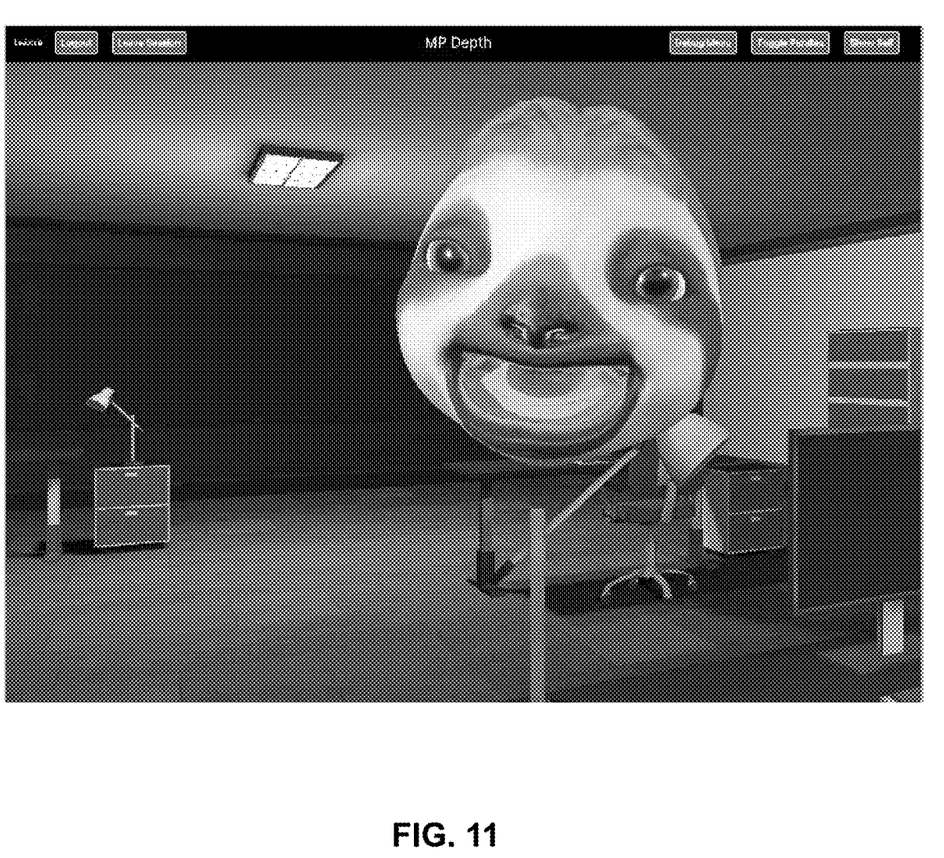

In another example application, the present embodiments can be used in video-based telecommunications with directionality with moveable cameras. As illustrated in the example diagram of FIG. 7, in some cases, both of the one or more cameras 704, 706 can be mounted on a respective moveable apparatus 706, 708 (such as an automated robotic arm) that moves the camera, as directed by a respective view interpolator module 514, in front of the respective user. In some cases, further fixed cameras 710, 712 and 714, 716 can be used to gain other perspectives of the respective users.

In an example implementation of the system 100, openCV and dlib can be used for real-time video processing, facial pose estimation, and facial feature extraction. The resulting data can then be streamed into the Unity Game Engine, where the resulting renderings of objects and avatars are presented. Unity can provide accessible control of the object (or avatar) and also of the virtual camera location from which the object is rendered. In another example implementation of the system 100, ARKit by Apple™ facial tracking can be used to facial pose estimation and facial feature extraction.

The present inventor conducted example experiments to substantiate the advantages of the present embodiments. FIGS. 8 to 11 illustrate an output visualization from one such example experiment. In this example, person A is represented on the screen of person B as a raccoon avatar placed in front of virtual objects. As the system 100 tracks person B's eyes, the virtual viewpoint of the avatar and the background objects are automatically shifted to match the directionality of the changed position of the person B's eyes.

Although the foregoing has been described with reference to certain specific embodiments, various modifications thereto will be apparent to those skilled in the art without departing from the spirit and scope of the invention as outlined in the appended claims. The entire disclosures of all references recited above are incorporated herein by reference.

The invention claimed is:

1. A computer-implemented method for determining directionality of an onscreen display of three-dimensional (3D) images using sensor data from a sensor that captures eye location of a user, the method comprising:
receiving the sensor data from the sensor that captures the eye location of the user;
tracking the location of the eyes of the user relative to a screen displaying the onscreen display of 3D images using the received sensor data;
determining a rendering of the onscreen displays of 3D images using off-axis projective geometry based on the tracked location of the eyes of the user to simulate a viewpoint of the onscreen displays of 3D images from a perspective of the location of the eyes of the user, the off-axis projective geometry is used to simulate motion parallax by applying a homogenous matrix that depends on the location of the object relative to the location of the eyes of the user and the location of the object relative to a device capturing the object; and
displaying the rendering of the onscreen displays of 3D images on the screen.

2. The method of claim 1, wherein the sensor data comprises a series of images captured by the sensor directed at the eyes of the user, the sensor being a camera.

3. The method of claim 2, wherein the location of the eyes of the user is determined using a perspective-n-point algorithm.

4. The method of claim 3, wherein the location of the eyes of the user is determined using Light Detection and Ranging (Lidar) or RGB-D cameras.

5. The method of claim 2, wherein determining the rendering of the onscreen displays of 3D images comprises determining the off-axis projective geometry by projecting the images captured by the sensor onto a plane that is projected to be in a same location relative to a camera-projector as the user is relative to the camera position, and copying the content of the planar canvas onto a screen buffer of the screen.

6. The method of claim 1, wherein the onscreen displays of 3D images comprises a three-dimensional object, and wherein determining the rendering of the onscreen displays of 3D images comprises rendering a viewing angle of the three-dimensional object based on the location of the eyes of the user relative to the screen.

7. The method of claim 6, wherein the sensor data further comprises facial features to extract a facial expression, and wherein the three-dimensional object comprises a three-dimensional avatar of the user mimicking the user's facial expressions.

8. The method of claim 1, wherein the onscreen displays of 3D images comprises a recorded video of a secondary user, the video recorded by an array of cameras to film multiple viewpoints of the secondary user, and wherein the viewpoint of the onscreen displays of 3D images for the user matches at least one of the multiple viewpoints.

9. The method of claim 8, wherein the array of cameras comprises four cameras.

10. A system for determining directionality of an onscreen display of three-dimensional (3D) images using sensor data from a sensor that captures eye location of a user, the system comprising one or more processors in communication with a memory storage, the one or more processors configured to execute:

an input module to receive, from the sensor, the sensor data that captures the eye location of the user;

a tracking module to track the location of the eyes of the user relative to a screen displaying the onscreen display of 3D images using the received sensor data;

a rendering module to determine a rendering of the onscreen displays of 3D images using off-axis projective geometry based on the tracked location of the eyes of the user to simulate a viewpoint of the onscreen displays of 3D images from a perspective of the location of the eyes of the user, the off-axis projective geometry is used to simulate motion parallax by applying a homogenous matrix that depends on the location of the object relative to the location of the eyes of the user and the location of the object relative to a device capturing the object; and     an output module to display the rendering of the onscreen displays of 3D images on the screen.

11. The system of claim 10, wherein the sensor comprises a camera and the sensor data comprises a series of images captured by the sensor directed at the eyes of the user, the sensor being a camera.

12. The system of claim 11, wherein the location of the eyes of the user is determined using a perspective-n-point algorithm.

13. The system of claim 12, wherein the location of the eyes of the user is determined using Light Detection and Ranging (Lidar) or RGB-D cameras.

14. The system of claim 11, wherein determining the rendering of the onscreen displays of 3D images comprises determining the off-axis projective geometry by projecting the images captured by the sensor onto a plane that is projected to be in a same location relative to a camera-projector as the user is relative to the camera position, and copying the content of the planar canvas onto a screen buffer of the screen.

15. The system of claim 10, wherein the onscreen displays of 3D images comprises a three-dimensional object, and wherein determining the rendering of the onscreen displays of 3D images comprises rendering a viewing angle of the three-dimensional object based on the location of the eyes of the user relative to the screen.

16. The system of claim 15, wherein the sensor data further comprises facial features to extract a facial expression, and wherein the three-dimensional object comprises a three-dimensional avatar of the user mimicking the user's facial expressions.

17. The system of claim 10, wherein the onscreen displays of 3D images comprises a recorded video of a secondary user, the video recorded by an array of cameras to film multiple viewpoints of the secondary user, and wherein the viewpoint of the onscreen displays of 3D images for the user matches at least one of the multiple viewpoints.

18. The system of claim 17, wherein the array of cameras comprises four cameras.

* * * * *